UNITED STATES PATENT OFFICE.

GEORG EICHELBAUM, OF BERLIN, GERMANY, ASSIGNOR TO FARBENFABRIKEN OF ELBERFELD CO., OF NEW YORK, N. Y.

PROCESS OF PRODUCING ALBUMOSES.

SPECIFICATION forming part of Letters Patent No. 682,181, dated September 10, 1901.

Application filed April 16, 1898. Serial No. 677,866. (No specimens.)

*To all whom it may concern:*

Be it known that I, GEORG EICHELBAUM, doctor of philosophy, residing at Berlin, Germany, (assignor to the FARBENFABRIKEN OF ELBERFELD CO., of New York,) have invented a new and useful Improvement in the Production of Albumoses; and I hereby declare the following to be a clear and exact description of my invention.

My present invention relates to a process for the production of albumoses by treating albumen compounds at elevated temperatures with watery solutions of bisulfites, such as bisulfite of lime, sodium bisulfite, potassium bisulfite, or the like.

It may be remarked that within the term "albumen compounds" I understand all kinds of albumens and albuminous matters, such as animal or vegetable albumens and the different kinds of derivatives of albumens—for instance, the so-called "acidalbumens," "syntonines," "albuminates," or the like or the so-called "methylenalbumens"—which are obtained by the action of formic aldehyde on albumen or albuminous matters or the like.

In carrying out my new process practically I can proceed as follows, the parts being by weight: Ten parts of minced-meat fiber are mixed with ten parts of a five-per-cent. watery solution of so-called "bisulfite of lime" in an autoclave provided with a stirring apparatus. The mixture is heated for about four hours at about from 90° to 100° centigrade with stirring. After this time the resulting mixture is diluted by means of water heated to boiling and rendered slightly alkaline with the aid of slaked lime. Subsequently it is filtered. Into the resulting solution a current of gaseous carbonic acid is introduced in order to precipitate the lime still contained therein. The liquid is filtered again and finally evaporated to dryness. Thus a yellowish-white powder is obtained which is readily soluble in water and represents a mixture of several kinds of known albumoses and contains but small quantities of peptone and of salts, which can readily be removed by one of the processes known or in use for this purpose.

I wish it to be understood that I do not intend to confine myself to the particulars given in the above example, as this is merely typical. Thus, for instance, instead of the meat albumen employed in the example any other of the above-defined albumen compounds can be used, and the bisulfite of lime can be replaced (though less profitably) by another of the hereinbefore-mentioned bisulfites. The temperature and the degree of dilution or concentration may be varied within wide limits without altering thereby the result of the process. Such or the like modifications do not change the nature of my present invention.

Having now described this invention and in what manner the same is to be performed, what I claim as new, and desire to secure by Letters Patent, is—

1. The herein-described process for the conversion of albumen into albumoses in which the formation of peptones is practically prevented, consisting in first heating such albumen with solutions of bisulfites in closed vessels at a temperature below 100° centigrade; secondly removing the acid contained in the reaction mixtures, and thirdly, separating the albumoses from the liquids thus obtained, substantially as described.

2. The herein-described process for the conversion of albumen into albumoses in which the formation of peptones is practically prevented, consisting in first heating in closed vessels such albumen with a five-per-cent. watery solution of bisulfite of lime at a temperature of about 90° to 100° centigrade, secondly removing the acid contained in the reaction mixtures, and thirdly, separating the albumoses from the liquids thus obtained, substantially as described.

In testimony whereof I have signed my name in the presence of two subscribing witnesses.

GEORG EICHELBAUM.

Witnesses:
C. H. DAY,
HENRY HASPER.